United States Patent [19]
Murata

[11] Patent Number: 5,860,501
[45] Date of Patent: Jan. 19, 1999

[54] CLUTCH DEVICE

[75] Inventor: Kiyohito Murata, Susono, Japan

[73] Assignee: Toyota Jidosha Kabushiki Kaisha, Toyota, Japan

[21] Appl. No.: 824,729

[22] Filed: Mar. 26, 1997

[30]  Foreign Application Priority Data

Mar. 27, 1996 [JP] Japan .................................. 8-072518

[51] Int. Cl.⁶ ................................................. F16H 39/00
[52] U.S. Cl. ........................ 192/58.92; 192/208; 464/24
[58] Field of Search ................................ 192/58.92, 208; 464/24

[56] References Cited

U.S. PATENT DOCUMENTS

| | | | |
|---|---|---|---|
| Re. 33,713 | 10/1991 | Watanabe et al. ................. | 192/21.5 X |
| 3,298,489 | 1/1967 | Brand ................................... | 192/58.92 |
| 4,214,652 | 7/1980 | Quenneville ......................... | 192/58.92 |
| 5,036,963 | 8/1991 | Murata . | |
| 5,070,975 | 12/1991 | Tanaka et al. . | |
| 5,154,252 | 10/1992 | Kawai et al. ....................... | 192/58.92 X |
| 5,593,016 | 1/1997 | Murata et al. . | |
| 5,603,396 | 2/1997 | Murata et al. . | |

FOREIGN PATENT DOCUMENTS

| | | |
|---|---|---|
| 0 250 684 | 1/1988 | European Pat. Off. . |
| 32 30 607 | 2/1984 | Germany . |
| 57-33253 | 2/1982 | Japan . |
| 62-288770 | 12/1987 | Japan . |
| 63-13959 | 1/1988 | Japan . |
| 63-231058 | 9/1988 | Japan . |
| 3-51564 | 3/1991 | Japan . |
| 602586 | 5/1948 | United Kingdom . |

OTHER PUBLICATIONS

Patent Abstract of Japan, vol. 08, No. 061 (M–284), Mar. 23, 1984, JP 58 211542, Dec. 9, 1983.
Patent Abstract of Japan, vol. 016, No. 248 (M–1261), Jun. 5, 1992, JP 04 056615, Feb. 24, 1992.

*Primary Examiner*—Charles A. Marmor
*Assistant Examiner*—Saul Rodriguez
*Attorney, Agent, or Firm*—Oblon, Spivak, McClelland, Maier & Neustadt, P.C.

[57] ABSTRACT

A clutch device separates a non-changing component and a changing component of power generated by a driving source, and transmits the non-changing component and the changing component of power so separated to separate driven bodies, respectively. Power generated by a driving source is preferably subjected to form conversion by a power form converter and is then separated into a non-changing component and a changing component by a power separator. The non-changing component of power so separated is transmitted to a first driven body by a non-changing component transmitter while the changing component of power so separated is transmitted to a second driven body by a changing component transmitter. A fluid pump can be used as the power form transmitter, and an outlet flow rate regulating valve of the fluid pump can be used as the power separator. Control of the second driven body can be made easily by smoothing the changing component of power separated by using a smoother.

3 Claims, 9 Drawing Sheets

CLUTCH DEVICE

BACKGROUND OF THE INVENTION

1. Field of the Invention

This invention relates to a clutch device.

2. Description of the Related Art

A friction clutch using a friction plate has gained a wide application as a clutch device for interruptedly transmitting power generated by a driving source to a driven body. Examples of such a friction clutch includes a clutch to be combined with a manual transmission of a car, a so-called "lockup clutch" disposed inside a torque convertor of an automatic transmission, and so forth.

On the other hand, a variety of prime movers are used as the driving source, and most of the prime movers involve a torque change during one cycle of rotation.

In reciprocating-piston-type internal combustion engines that have been most widely employed for cars, for example, the torque change occurs due to reciprocation of the pistons and due to the pressure change inside a combustion chamber, and an axle rotates with a torque change and with a rotation change.

If this change is transmitted to the driven body, the driven body vibrates and in the case of the car described above, for example, this vibration is transmitted to the car body, so that a driver feels uncomfortable and the commercial value of the car is lowered.

Therefore, a power transmission apparatus which reduces the frictional engagement force of a friction clutch to prevent transmission of the torque change of the engine to the car body and transmits power while slipping the friction clutch is known (Japanese Unexamined Patent Publication (Kokai) No. 57-33253).

Nonetheless, slip of the friction clutch means conversion of a part of power inputted from the prime mover to heat energy and to discard it, and results in a great waste of energy.

SUMMARY OF THE INVENTION

It is therefore an object of the present invention to provide a clutch device which transmits only a non-changing component of power inputted from a driving source to a certain driven body, and transmits also a changing component to another driven body without discarding it so as to effectively utilize it.

According to the present invention there is provided a clutch device which comprises power separation means for separating a non-changing component and a changing component of power generated by a driving source, non-changing component transmission means for transmitting the non-changing component of power so separated to a first driven body, and changing component transmission means for transmitting the changing component of power so separated to a second driven body.

The present invention will be more fully understood from the description of preferred embodiments thereof when taken with the accompanying drawings.

DESCRIPTION OF THE PREFERRED EMBODIMENTS

Figure 1:
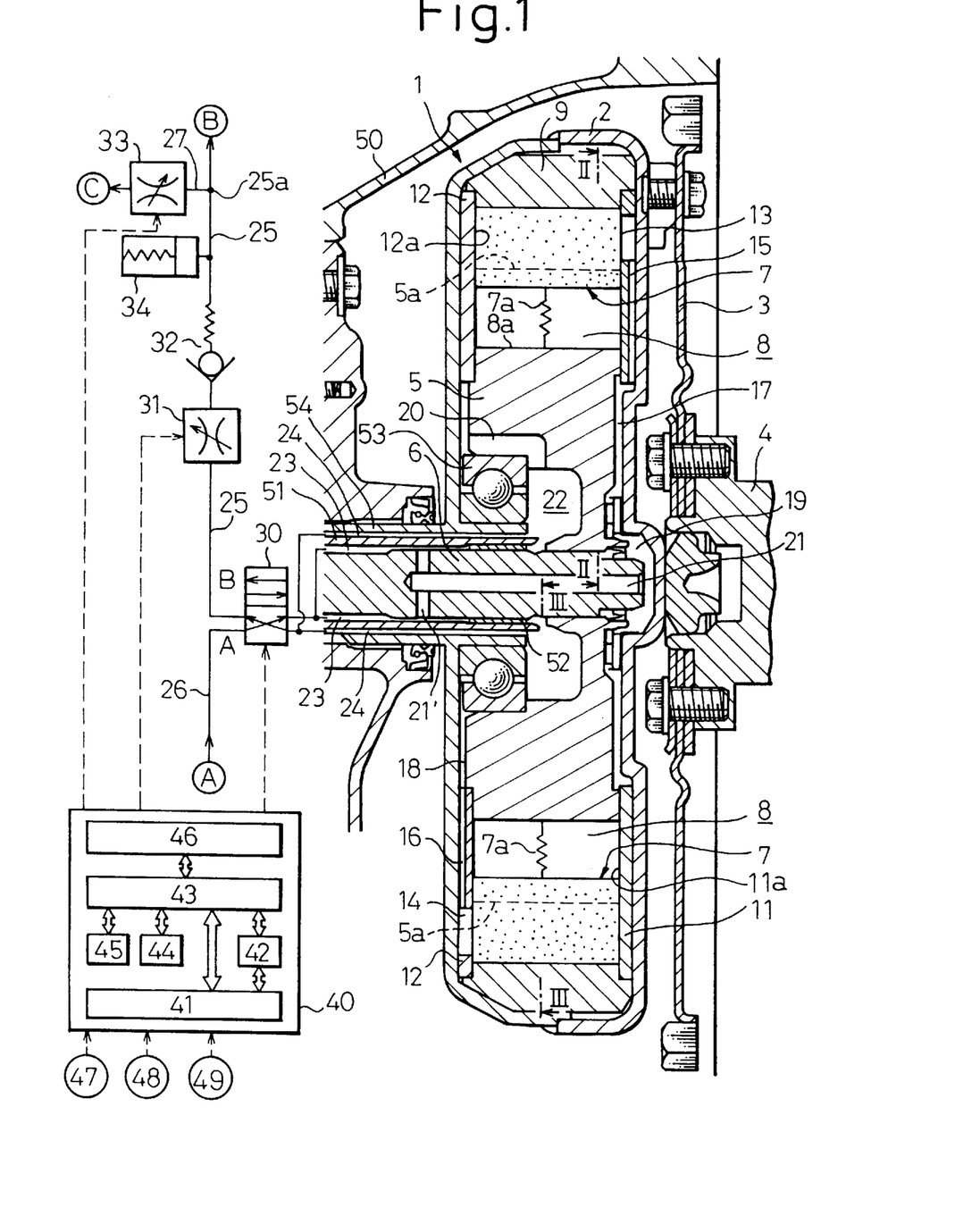
FIG. 1 is a schematic view showing the construction of a clutch device according to an embodiment of the present invention.

Referring to the drawings, FIG. 1 is a sectional view along a plane passing through the axis of rotation. The upper portion from the center axis corresponds to a view taken along a line I—I of FIG. 2, and the lower portion from the center axis corresponds to a view taken along a line I—I of FIG. 3.

Figure 2:
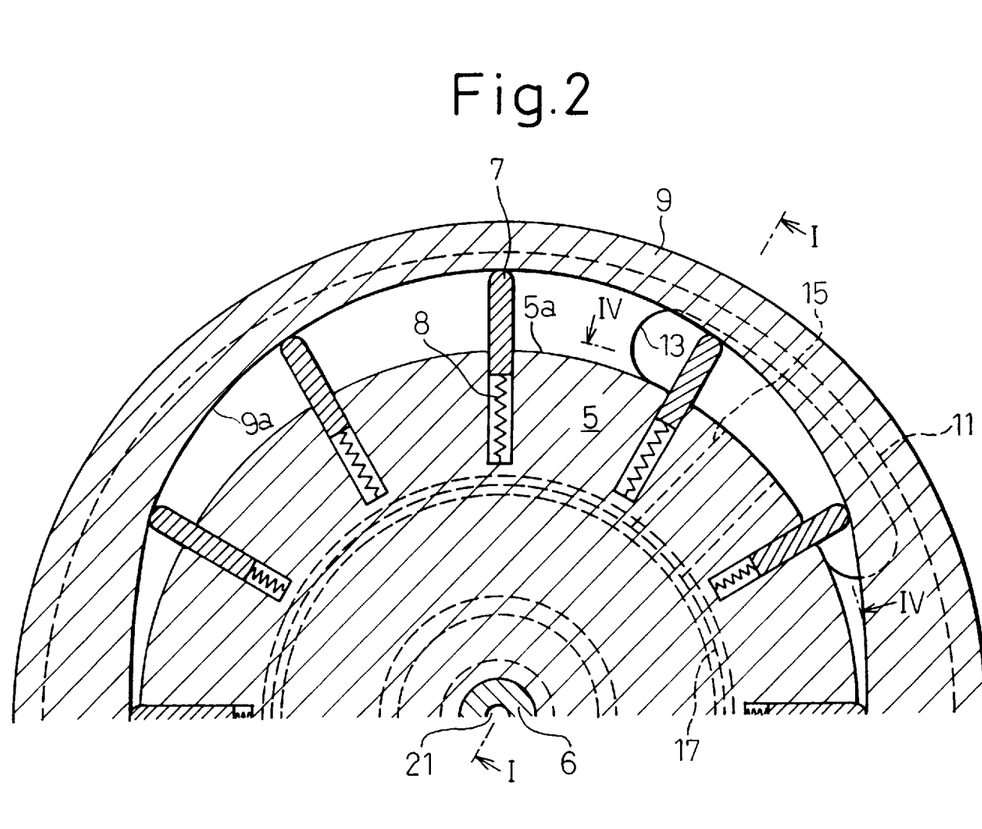
FIG. 2 is a sectional view taken along a line II—II of FIG. 1.
Figure 3:
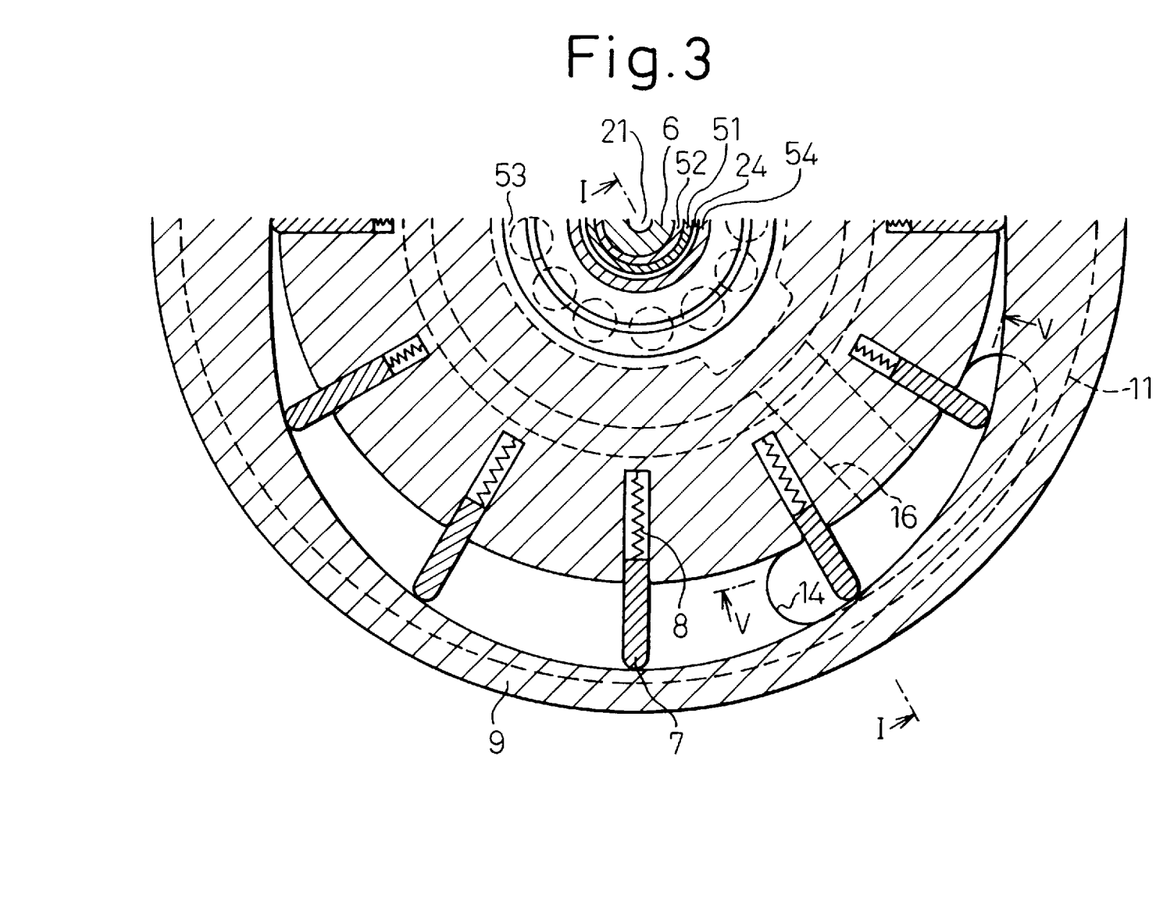
FIG. 3 is a sectional view taken along a line III—III of FIG. 1.
Figure 4:
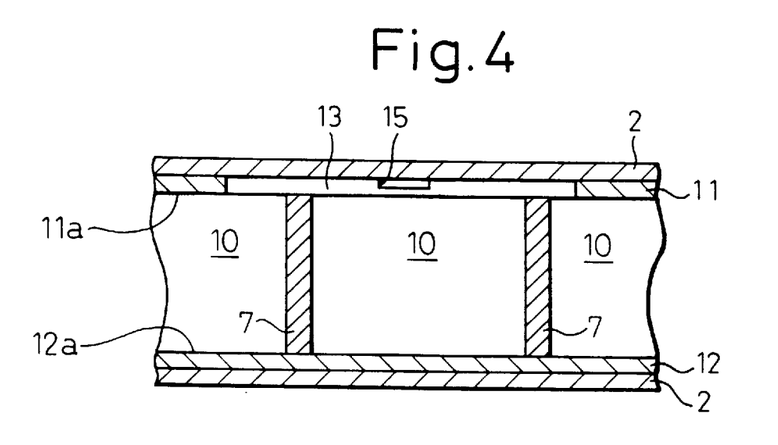
FIG. 4 is a sectional view taken along a line IV—IV of FIG. 2.
Figure 5:
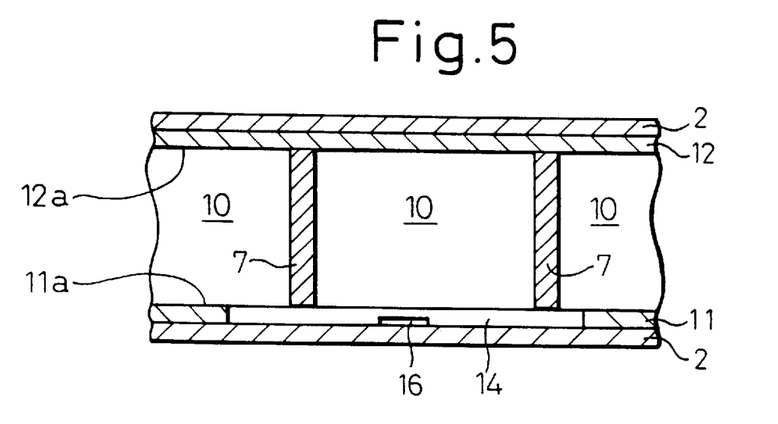
FIG. 5 is a sectional view taken along a line V—V of FIG. 3.

FIG. 2 is a sectional view taken along a line II—II of FIG. 1, FIG. 3 is a sectional view taken along a line III—III of FIG. 1, FIG. 4 is a sectional view taken along a line IV—IV of FIG. 2 and FIG. 5 is a sectional view taken along a line V—V of FIG. 3.

Reference numeral 1 in FIG. 1 denotes a vane pump, and its outer shell 2 is coupled with a crank shaft 4 of an engine (not shown) through a drive plate 3. An outer rotor 9 having an elongated circular inner peripheral surface as viewed from the axial direction is fixedly provided to the inside of the outer shell 2 in its radial direction.

An inner rotor 5 is spline-coupled with an input shaft of a transmission 6. Vanes 7 are fitted into grooves 8 which are formed radially, in such a manner as to be movable in the radial direction. A spring 7a is interposed between each vane 7 and the bottom portion 8a of each groove 8 and normally biases outward the vane 7 in the radial direction.

The vane 7 has a substantially rectangular shape, and its outer edge portion in the radial direction always keeps contact with the inner peripheral surface 9a of the outer rotor 9. The outer edge portion of the vane 7 in the axial direction keeps contact with the inner side surfaces 11a and 12a of first and second side walls 11 and 12 that are fixed to the inside of the outer shell 2.

In consequence, a plurality of oil chambers 10 are defined by two vanes 7 adjacent to each other, the outer peripheral surface 5a of the inner rotor 5, the inner peripheral surface 9a of the outer rotor 9, the inner side surface 11a of the first side wall 11 and the inner side surface 12a of the second side wall 12 (see FIGS. 2 and 3).

A first opening portion 13 is formed in the first side wall 11 (see FIGS. 2 and 4). This first opening portion 13 communicates with a first groove-like oil path 15 formed by cutting off a part of the outside of the first side wall 11 in the axial direction, with a first ring-like oil chamber defined between the outer shell 2 and the inner rotor 5, with a shaft end oil chamber 19 defined outside the input shaft 6 of the transmission in the axial direction and with an axial oil chamber 21 defined inside the input shaft 6 of the transmission. Furthermore, the first opening portion 13 communicates with a first shafting oil path 23 defined between the input-shaft 6 of the transmission and a support member 51 fixedly coupled with a transmission case 50 at a portion not shown in the drawing.

Reference numeral 52 denotes a bush which rotatably supports the input shaft 6 of the transmission with respect to the support member 51 and prevents the oil path 12 from communicating with a center oil chamber 20 defined at the center of the inner rotor 5.

Similarly, a second opening portion 14 is provided to the second side wall 12 (see FIGS. 3 and 5). This second opening portion 14 communicates with a second groove-like oil path 16 formed by cutting off a part of the outside of the second side wall 12 in the axial direction, with a second ring-like oil chamber 18 defined between the outer shell 2 and the inner rotor 5 and with a center oil chamber 22 formed at the center of the inner rotor 5 through a communication oil path 20 formed outside a bearing 53. Furthermore, the second opening portion 14 communicates with a second shafting oil path 24 defined between a tubular shell 54 formed integrally with the outer shell 2 and the support member 51.

The oil path 23 and the oil path 24 are connected to the oil path 25 and the oil path 26 by a change-over valve 30. The change-over valve 30 has two oil circuits A and B. When the oil circuit A is selected, the change-over valve connects the oil path 23 to the oil path 26 and the oil path 24 to the oil path 25. When the oil circuit B is selected, it connects the oil path 23 to the oil path 25 and the oil path 24 to the oil path 26.

The oil path 26 is for sucking, and its distal end is open into an oil reservoir of an oil pan 55 (see FIG. 6) through a strainer (not shown).

Figure 6:
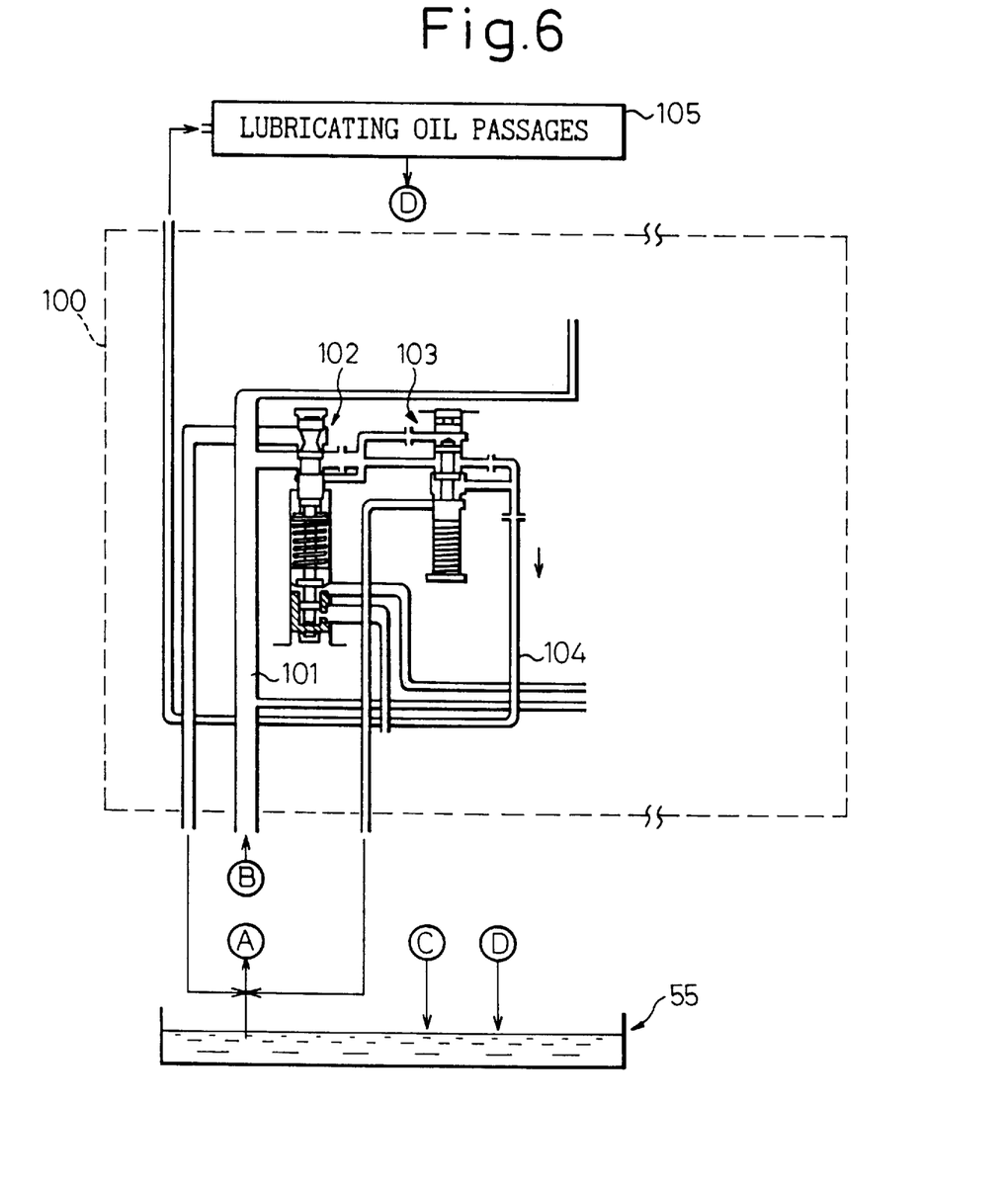
FIG. 6 is a schematic view showing a part of an oil pressure circuit.

On the other hand, the oil path 25 is connected to an oil path 101 shown in FIG. 6 through a first variable throttle valve 31 and a check valve 32, and an oil path 27 branches from a branch point 25a. The distal end of this oil path 27 is released to the oil pan 55 (see FIG. 6), and a second variable throttle valve 33 is disposed at an intermediate portion.

An accumulator 34 is interposed between the check valve 32 and the branch point 25a in the oil path 25.

By the way, switching of the change-over valve 30 and openings of the first and second variable throttle valves 31 and 33 are controlled by a transmission control unit (hereinafter called the "TCU") in accordance with the operation condition.

The TCU 40 comprises a digital computer, and includes an input interface circuit 41, an ADC (analog-to-digital convertor) 42, a CPU (microprocessor) 43, a RAM (random access memory) 44, a ROM (read-only memory) 45, an output interface circuit 46, etc., that are mutually connected.

Output signals from an engine number-of-revolution sensor 47, a throttle sensor 48, an idle switch 49, etc., are inputted to the CPU 43 through the interface circuit 41 or further through the ADC 42.

The CPU 43 generates the signal for operating the change-over valve 30, the first variable throttle valve 31 and the second variable throttle valve 33 in accordance with the operation condition on the basis of the values of the various sensors described above, and sends them through the output interface circuit 46.

Figure 7:
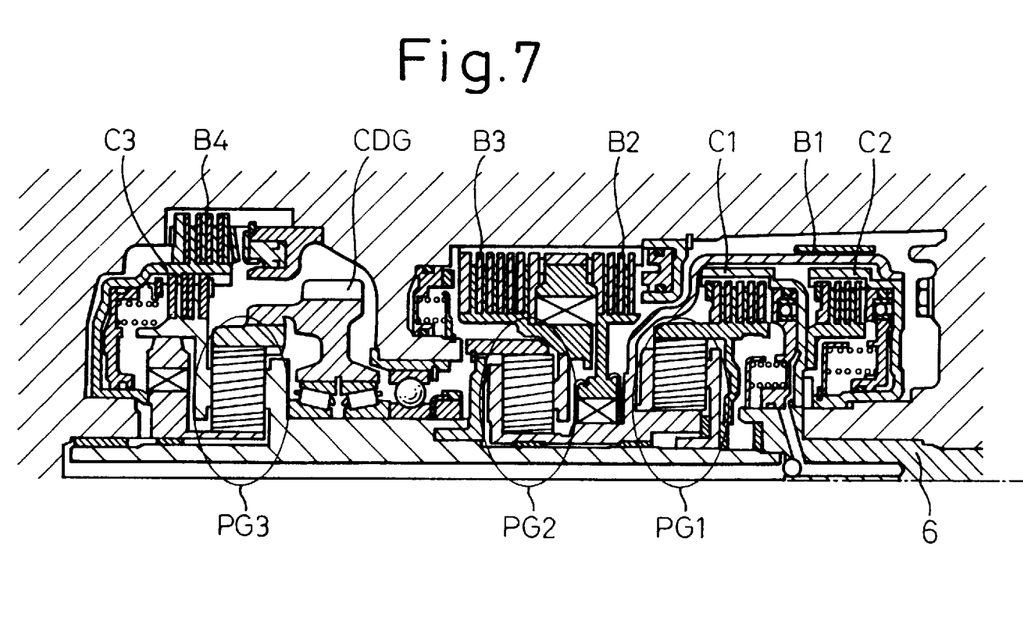
FIG. 7 is a schematic view showing the internal construction of a transmission portion.

FIG. 6 shows a portion for executing a subsequent processing of the operation oil which is discharged from the vane pump 1 shown in FIG. 1 and the pressure of which is regulated by the first variable throttle valve 31. FIG. 7 schematically shows the internal construction of the transmission portion.

Dashed line 100 in FIG. 6 represents an oil pressure control unit for receiving the operation oil, which is discharged from the vane pump 1 shown in FIG. 1 and the pressure of which is regulated by the first variable throttle valve 31, etc., and engaging and releasing each clutch inside the transmission shown in FIG. 7 and the brake in accordance with the shift position desired by the driver and with the operation condition, or regulating the pressure of the operation oil and distributing it so as to lubricate each component inside the transmission. The portion shown inside the dashed line in FIG. 6 is only a part of the oil pressure control unit.

In FIG. 6, reference numeral 101 denotes a line pressure feed oil path which is connected to the discharge oil path 25 shown in FIG. 1, receives the operation oil whose pressure is regulated by the first variable throttle valve 31, etc., from the vane pump 1, and distributes it to predetermined portions inside the transmission, whenever necessary, after regulating the pressure to a so-called "line pressure".

A primary regulator valve 102 regulates the pressure of the operation oil introduced into the line pressure feed oil path 10 to the line pressure as described above.

A secondary regulator valve 103 receives the operation oil from the line pressure feed oil path 101 through a part of the primary regulator valve 102, regulates its pressure to a pressure suitable for lubricating the inside of the transmission and sends it to a lubricant oil path 105 formed inside the transmission shown in FIG. 6 through the oil path 104.

FIG. 7 schematically shows the internal construction of the transmission portion. This transmission includes three planetary gear units, that is, first, second and third planetary gear units PG1, PG2 and PG3, interposed between the input shaft 6 and a counter-drive gear CDG not shown in the drawing and engaging with the output shaft. This transmission is an automatic transmission for obtaining four forward ratios and one reverse ratio by selectively engaging and stopping the engagement mechanisms for engaging and disengaging each element of these planetary gear units with the first clutch C1, the second clutch C2, the third clutch C3, the first brake B1, the second brake B2, the third brake B3 and the fourth brake B4, and has six shift positions of P, R, N, D, 2 and L.

To engage each engagement mechanism, the operation oil whose pressure is regulated to the line pressure by the primary regulator valve 102 shown in FIG. 6 is sent to the piston portion of each engagement mechanism.

The principle of the operation of the clutch device will be described prior to the explanation of its actual operation.

Generally, pumps pressure-feed a fluid sucked from a suction port towards a discharge port and discharge it from the discharge port. When the discharge port is closed by a certain force, therefore, the fluid is not discharged and the fluid inside the pump stops its motion unless any force overcoming this certain force acts from the fluid.

Therefore, when the discharge port is closed as described above, the vane pump functions as a rigid body as a whole in the case of the vane pump whose outer shell is interconnected to the engine and whose inner rotor is interconnected to the transmission as in this embodiment, and the driving force of the engine is as such transmitted to the input shaft of the transmission through the inner rotor.

Figure 8A:
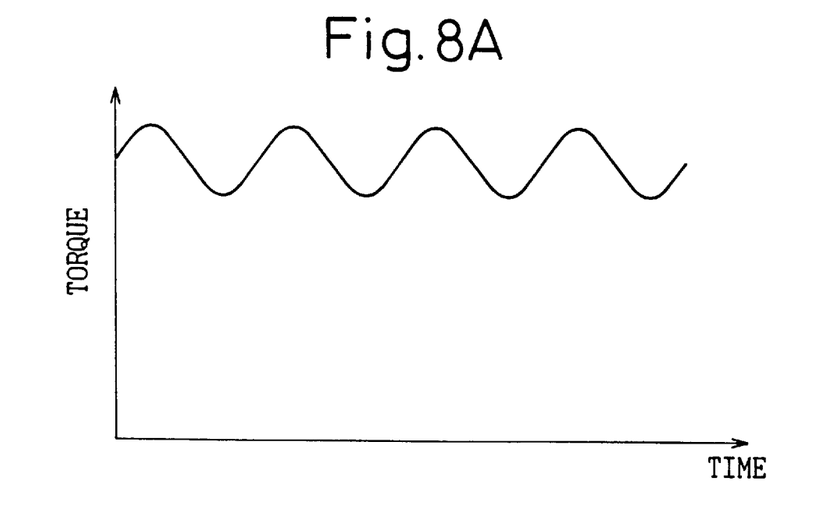
FIG. 8A and 8B are diagrams for explaining the principle of operation of the present invention.
Figure 8B:
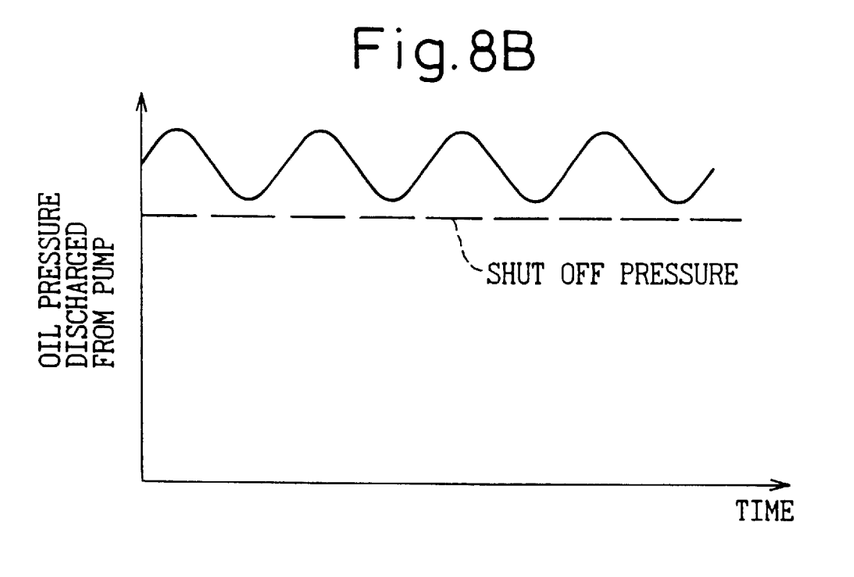

Here, the torque generated by the engine changes as shown in FIG. 8A and along therewith, the discharge pressure of the pump changes as shown in FIG. 8B.

Figure 9A:
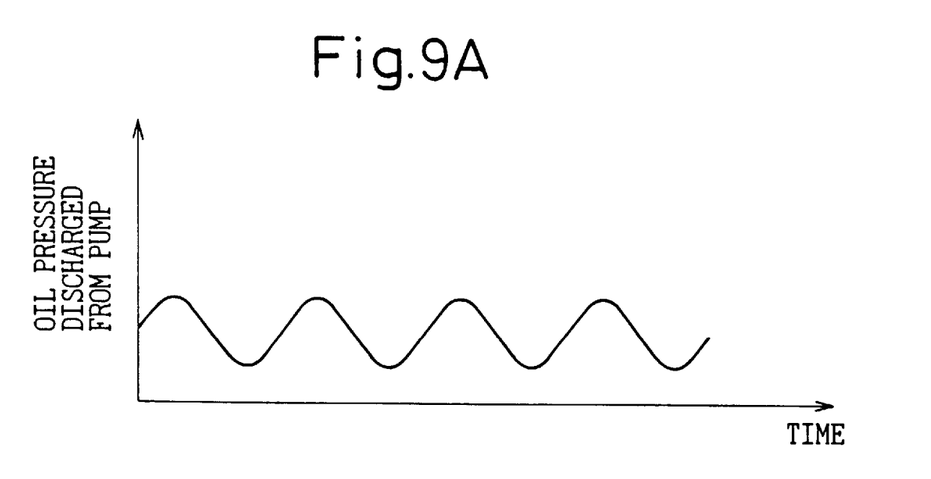
FIG. 9A and 9B are diagrams for explaining the principle of operation of the present invention.

Therefore, when the discharge port is closed by the closing pressure represented by the dashed line in FIG. 8B, the portion containing the changing component exceeding this closing pressure is separated and discharge as shown in FIG. 9A.

Figure 9B:
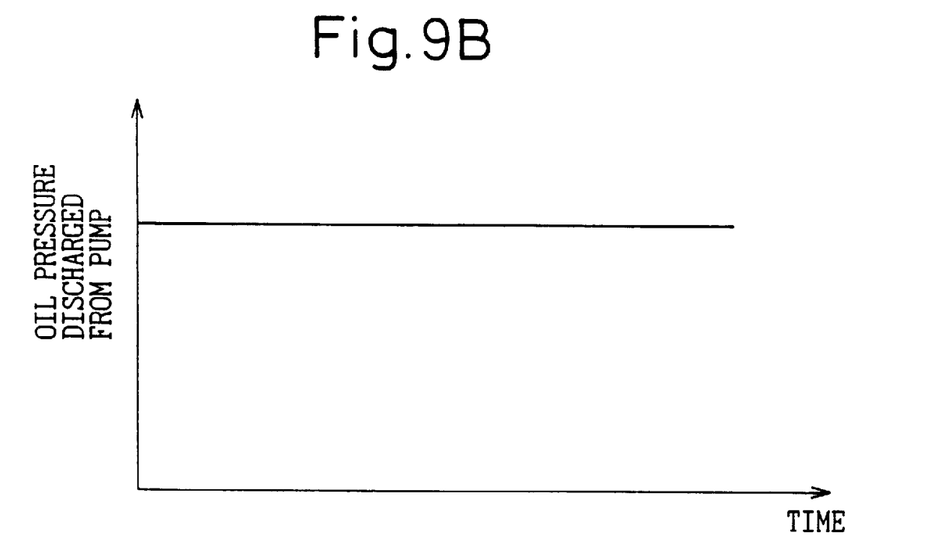

On the other hand, the rest of the portions are stored inside the pump as the pressure fluid not containing the changing component as shown in FIG. 9B, and are converted to the torque for rotating the input shaft of the transmission through the inner rotor.

Hereinafter, the control of the operation of the embodiment of the present invention based on the principle described above will be explained.

In the P range, in the first place, the change-over valve 30 is set to the A position, the oil path 23 is connected to the oil path 26 and the oil path 24 is connected to the oil path 25. Further, the first variable throttle valve 31 is opened substantially fully while the second variable throttle valve 33 is fully closed.

Since the range is the P range, the input shaft 6 of the transmission stops, and the inner rotor 5 connected to the input shaft 6 stops as well.

On the other hand, the outer shell 2 and the outer rotor 9, the first side wall 11 and the second side wall 12 fitted to outer shell 2 are rotated by the driving force of the engine.

Under this state, therefore, the operation as the normal pump whose discharge port is not closed is carried out because the first variable throttle valve 31 is open.

The operation oil is sucked from the oil pan 55 through the oil path 26, enters the oil path 23 through the change-over valve 30 (A route), and serially flows into a plurality of oil chambers 10 partitioned by the vanes 7 from the change-over valve 30 through the oil path 21', the axial oil path 21, the axial end oil chamber 19, the first ring-like oil chamber 17, the first ring-like oil path 15 and the first opening portion 13.

The operation oil flowing into each of the oil chambers is compressed with the revolution of the outer shell 2 after the first opening portion 13 passes by the side surface, is discharged when the second opening portion 14 of the side surface on the opposite side comes to the side surface and then reaches the discharge oil path 25 from the second opening portion 14 to the second groove-like oil path 16, the second ring-like oil chamber 18, the communication oil path 20 and the center oil chamber 22 and then through the second shafting oil path 24 and the change-over valve 30.

Here, since the first variable throttle valve 31 is substantially fully open, the operation oil reaches the check valve 32 without being throttled by the first variable throttle valve 31. This check valve 32 is disposed so as only to stabilize the operation of the accumulator 34 and the set pressure of the valve spring is low. Therefore, the operation oil passes through this check valve 32, too, without receiving any resistance, in particular.

The operation oil passing through the check valve 32 is smoothed by the accumulator 34, and thereafter reaches as such the oil path 101 shown in FIG. 7 because the second variable throttle valve 33 is closed.

The pressure of the operation oil so reaching the oil path 101 is regulated by the primary regulator valve 102 or by the secondary regulator valve 103 as described already, and the oil is sent to each engagement element inside the transmission or to the lubricating circuit.

In the P range, on the other hand, the engine is driven almost in idling. Therefore, the opening of the first variable throttle valve 31 is regulated so that a sufficient line oil pressure can be secured even in the idling operation.

Next, an explanation will be given on the case where the operation is shifted to the D range and the car starts moving. The operation is the same as described above immediately after the shift to the D range, but when the accelerator pedal is pressed and the idle switch is turned OFF, the operation mode shifts to the start mode.

In the start mode, the first variable throttle valve 31 is gradually throttled. Then, the oil pressure in the oil chamber 10 rises, the relative rotation between the outer shell 2 of the vane pump 1 and the inner rotor 5 decreases and the input shaft 6 of the transmission spline-coupled with the inner rotor 5 gradually starts rotating.

Since the first clutch C1 and the third clutch C3 are engaged inside the transmission so that the first speed stage of the D range can be acquired simultaneously with the shift to the D range, the car starts moving. After the car speed rises, the first variable throttle valve 31 is set to an opening somewhat greater than the opening that provides a necessary line oil pressure. Then, the vane pump 1 exceeds the flow rate of this excessive opening and transmits the power of the engine to the transmission, thereby providing the driving state.

The operation oil flowing to the downstream side of the first variable throttle valve 31 is smoothed by the accumulator 34, and the oil pressure can be brought correctly into conformity with the necessary line oil pressure because the second variable throttle valve 33 adjusts the escape quantity.

Figure 10:
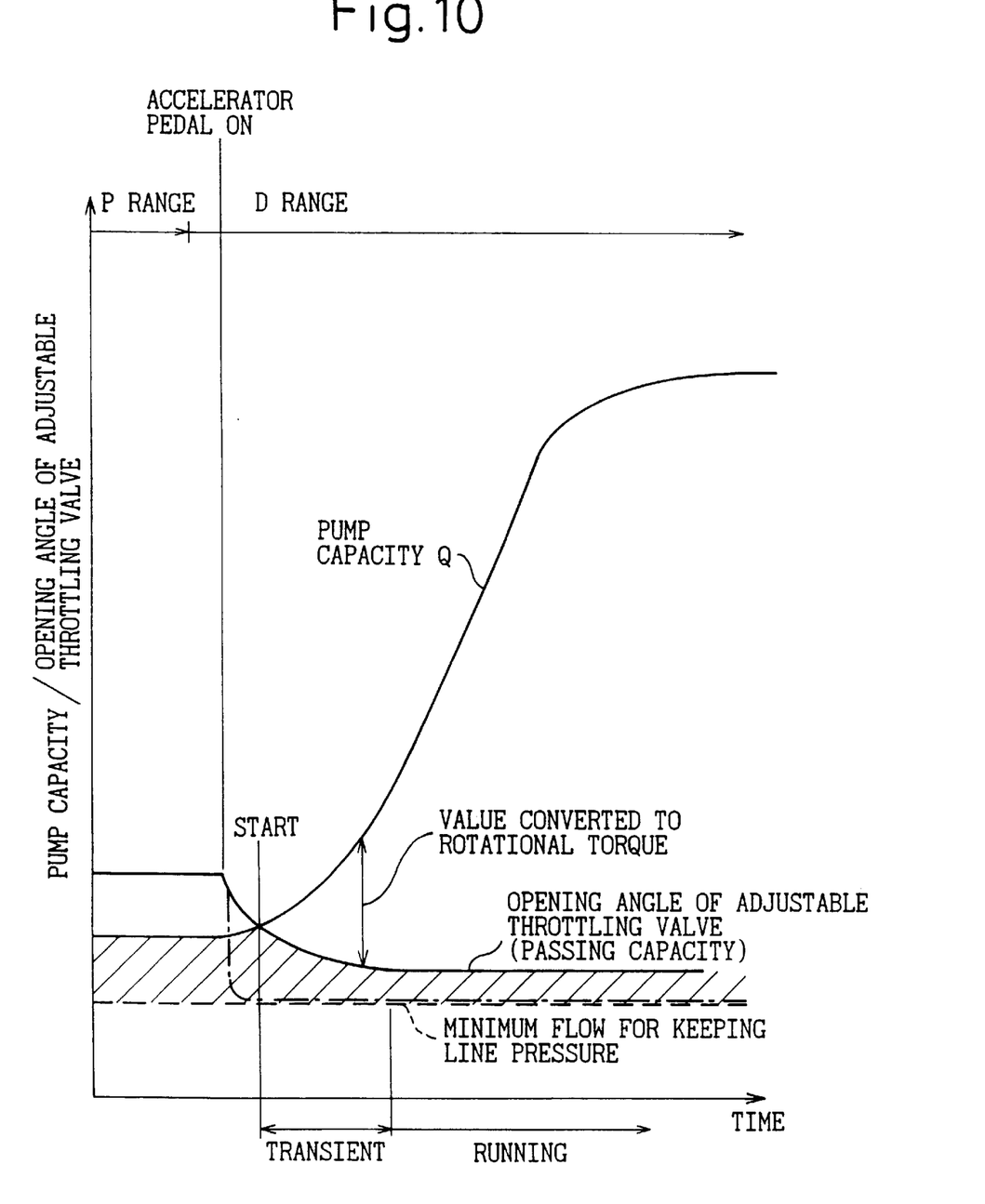
FIG. 10 is a diagram for explaining the principle of operation of an embodiment of the present invention.

FIG. 10 illustrates the changes of the supply capacity Q of the vane pump 1 and the opening (passing capacity) of the first variable throttle valve 31 from the start of the car from the parking state to the driving state described above.

As shown in FIG. 10, the start of the car takes place from the point of time at which the opening (passing capacity) of the first variable throttle valve 31 R exceeds the supply capacity Q of the vane pump 1. The difference between Q and R is converted to the turning torque and is transmitted to the input shaft 6 of the transmission.

In FIG. 10, the dashed line represents the minimum necessary flow rate for securing the line pressure, and the hatched portion represents the escape quantity by the second variable throttle valve 33 for correct matching with the line pressure.

By the way, the second variable throttle valve 33 can be omitted by adjusting the opening of the first variable throttle valve 31 as indicated by one-dot-chain line.

Since power transmission is effected at the oil pressure generated by the pump 1 and corresponding to the torque generated by the engine, the oil pressure control unit need not generate the oil pressure proportional to the torque generated by the engine, and the control system can be simplified.

By the way, in the case of the reverse driving state where the car is in the coasting operation and the force for turning the engine is inputted from the side of the transmission, the change-over valve 30 is switched to the B circuit. In consequence, the discharge oil path 25 is communicated with the first shafting oil path 23 and the operation oil flows from the second opening portion 14 of the pump 1 to the first opening. Since this operation is the same as that of the case of positive driving where the driving force is inputted from the engine side, the explanation of the overall pump operation will be omitted.

The present invention separates the power inputted from the driving source into the non-changing component and the changing component, and operates the separate driven bodies by the non-changing component and the changing component so separated. Therefore, the present invention can effectively utilize the changing component, too, and does not waste the inputted power.

When the axial turning torque is converted to the oil pressure by the fluid pump, the inputted power is converted to the fluid pressure proportional to the magnitude of the inputted power. Further, since the fluid pump constitutes a part of the oil pressure control circuit, the oil pressure control circuit can be simplified.

The changing component can be converted to the stable component not having the change by adding the smoothing means. Therefore, the operation control of the driven body becomes easier.

I claim:

1. A clutch device comprising:

power separation means for separating a non-changing component and a changing component of power generated by a driving source;

non-changing component transmission means for transmitting said non-changing component of power so separated to a first driven body; and changing component transmission means for transmitting said changing component of power so separated to a second driven body; and power form conversion means for converting the form of power generated by said driving source; wherein said power separation means separates a non-changing component and a changing component of power whose form is converted by said power form conversion means, and wherein power generated by said driving source is an axial rotation torque, said power form conversion means is a fluid pump and converts said axial rotation torque to a fluid pressure, and said power separation means is an outlet flow rate regulating valve of said fluid pump.

2. A clutch device according to claim 1, which further comprises:

smoothing means for smoothing said changing component separated.

3. A clutch device according to claim 2, wherein said smoothing means is an accumulator.

* * * * *